Dec. 31, 1968   MICHIO KUMAZAWA   3,418,816
FENDER FOR PROTECTING SHIPS ALONGSIDE A FIXED STRUCTURE
Filed May 26, 1967

INVENTOR.
MICHIO KUMAZAWA,
BY
Linton and Linton
ATTORNEYS.

United States Patent Office 3,418,816
Patented Dec. 31, 1968

3,418,816
FENDER FOR PROTECTING SHIPS ALONGSIDE A FIXED STRUCTURE
Michio Kumazawa, Yamatomachi, Japan, assignor to Seibu Gomu Kagaku Kabushiki Kaisha, Tokyo, Japan, a corporation of Japan
Filed May 26, 1967, Ser. No. 641,535
Claims priority, application Japan, Sept. 5, 1966, 41/83,434
2 Claims. (Cl. 61—48)

ABSTRACT OF THE DISCLOSURE

The present ships fender is provided by one or more hollow resilient bodies attached to a fixed structure such as a pier, wharf or the like and having one or more rigid members attached to said bodies for receiving the side of a ship and averting any concentration of the resulting bearing load on the fender or the side of the ship.

Summary of the invention

The present invention is concerned with a fender for protecting a ship alongside a fixed structure and has at least one elongated hollow resilient body whose bottom is attached to the fixed structure while extending vertically thereof, a plate in said body, at least one elongated rigid member positioned on the top of said body and extending horizontally thereof and means for attaching said rigid member to said plate and thus body whereby a ship docked alongside said fixed structure will contact said rigid member without causing a permanent strain in the ships side in contact with the fender.

Rubber fenders for preventing the sides of a ship from directly contacting a pier have heretobefore been known, but such fenders occasionally fail to protect the ship's sides and the local concentration of the bearing load on the ship's sides which come into contact with such fenders caused a permanent strain in the area of contact of the ship's sides.

According to the present invention a plurality of resilient bodies are arranged at the dock side of a pier and at the top of these bodies there are a plurality of rigid members mounted thereon for receiving the side of a ship to avert any concentration of the bearing load on the individual fenders as well as the side of the ship when in contact therewith.

The object of the present invention is to provide a fender to be mounted upon a fixed structure against which fender a side of a ship can bear without causing a permanent strain to the ships sides in the area of contact therewith.

Further objects of the invention will be in part obvious and in part pointed out in the following description of the accompanying drawing.

Description

In the drawings, FIG. 1 is a side elevation of the present fender as mounted upon a portion of a side of a fixed structure.

Figure 1:
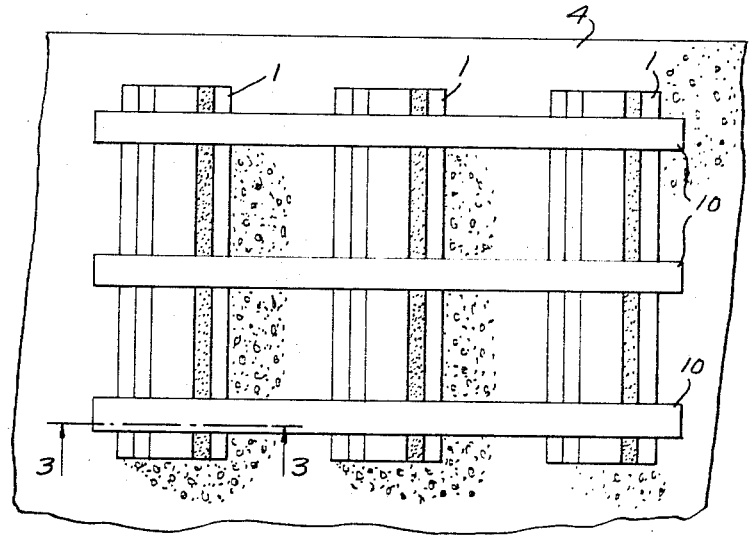
Figure 2:
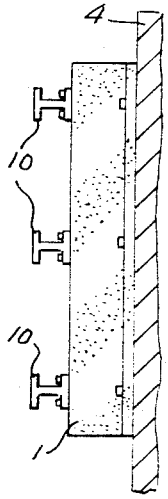
FIG. 2 is an end view of FIG. 1.

Referring now more particularly to the accompanying drawing wherein like and corresponding parts are designated by similar reference characters numeral 1 indicates a hollow resilient body formed from rubber, synthetic resin or other resilient material and which has bolts 2 extending through the bottom of said body and embedded within a fixed structure 4 such as a pier, wharf or the like. Nuts 3 are in threaded engagement with said bolts for retaining said body bottom against a vertical side of said fixed structure. A board or plate 6 is embedded in said body bottom for strengthening the attachment of said body to the fixed structure. A second board or plate 7 is embedded in the top of said body and has a pair of bolts attached thereto and extending from said body top. Boards or plates 6 and 7 are referred to hereinafter solely by the term "plates" and these plates are embedded in said body during the fabrication thereof so that they are encased in said body.

Elongated rigid members 10 which may be made of steel or may be a log, square timber or other rigid material is shown in the drawings by way of example only as I-shaped steel beam and are hereinafter reference to solely by the term "rigid member." Bolts 8 extend through a side of said rigid member and are retained thereon and against the top of the resilient body by means of nuts 9 in threaded engagement with said bolts 8.

Figure 3:
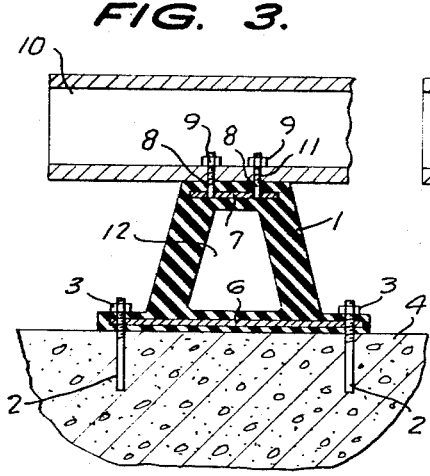
FIG. 3 is a cross-sectional view taken on line III—III of FIG. 1.
Figure 4:
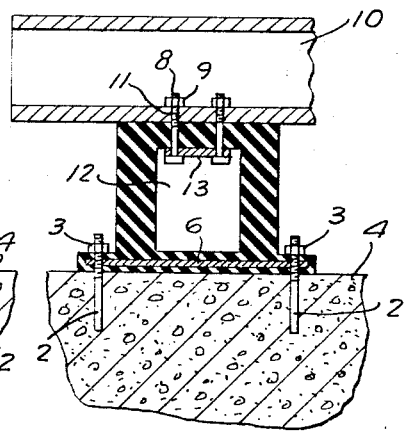
FIG. 4 is a cross-sectional view similar to FIG. 3, but of a modified form of fender.

In the modified form of the invention shown in FIG. 4 the bolts 8 extend through a washer 13 positioned within the hollow body 1 and through the top of said hollow body and a side of the rigid member 10 and is retained thereon by nuts 9. This modified form of the present device is otherwise similar to that described for the form shown in FIG. 3, except for the shape of the hollow body 1 and the elimination of plate 7.

In the use of the present fenders a plurality of the resilient bodies 1 are fixed to the dock side of the pier 4 by the bolts 2 and nuts 3 with said resilient bodies being positioned vertically but spaced apart in a series along said pier. A plurality of rigid members 10 are attached to said resilient members by bolts 8 and nuts 9 with said rigid members extending horizontally but spaced apart along the length of said resilient bodies.

With the present fender so mounted a ship positioned alongside a structure 4 will come into contact with the rigid members 10 with the ship side thus having a long and wide area thereof in contact with said rigid members 10 so that the pressure of such contact is not locally concentrated on the ship's side and prevents a permanent strain from being created in the side of the ship. Likewise the pressure of the ships side on the rigid members 10 is spread over a plurality of said rigid members so that it is possible to make the bearing capacity of each rigid member relatively small or to make the spacing between said rigid members relatively wide. Thus, when the bearing capacity of each rigid member is designed to be relatively small the dimensions of said rigid members can be substantially reduced lowering the cost of the fender. Also with the spacing of said rigid members being relatively wide the number of rigid members 10 required is reduced for covering a considerable length of the structure 4 also reducing the cost of the present fender.

The present invention is capable of considerable modifications, and such changes thereto as come within the scope of the appended claims is deemed to be a part thereof.

I claim:
1. A fender for protecting ships alongside a fixed structure comprising at least one hollow resilient body having a flat bottom, a flat top, sides connecting said bottom and top and a cavity in the interior thereof, means for attaching said body bottom to the fixed structure, at least one rigid member mounted on and extending across said body top for abutting a ship alongside said fixed structure, a plate encased in said body, bolts extending from said plate through said body top into said rigid member and nuts on said bolts retaining said rigid member attached to said bolts.

2. A fender for protecting ships alongside a fixed structure as claimed in claim 1, wherein said plate is embedded in said body between said body cavity and said body top.

References Cited

UNITED STATES PATENTS

| | | | |
|---|---|---|---|
| 2,655,005 | 10/1953 | Kinneman | 61—48 |
| 2,935,855 | 5/1960 | Reid | 114—219 X |
| 3,109,639 | 11/1963 | Nicolaisen | 267—1 |
| 3,261,320 | 7/1966 | Leonard | 114—219 |

FOREIGN PATENTS 1,355,659  2/1964  France.

JACOB SHAPIRO, *Primary Examiner.*

U.S. Cl. X.R.

114—219; 267—1; 293—71